United States Patent
Yin (10) Patent No.: US 11,397,596 B2
(45) Date of Patent: Jul. 26, 2022

(54) METHOD AND DEVICE FOR CONTROLLING POP-UP WINDOW, ELECTRONIC DEVICE, AND STORAGE MEDIUM

(71) Applicant: BEIJING DAJIA INTERNET INFORMATION TECHNOLOGY CO., LTD., Beijing (CN)

(72) Inventor: Jialu Yin, Beijing (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/137,847

(22) Filed: Dec. 30, 2020

(65) Prior Publication Data

US 2021/0334115 A1 Oct. 28, 2021

(30) Foreign Application Priority Data

Apr. 23, 2020 (CN) .......................... 202010331108.4

(51) Int. Cl.
*G06F 9/451* (2018.01)
*G06F 3/0481* (2022.01)
*G06F 3/0482* (2013.01)
*G06F 3/0488* (2022.01)

(52) U.S. Cl.
CPC ............ *G06F 9/451* (2018.02); *G06F 3/0481* (2013.01); *G06F 3/0482* (2013.01); *G06F 3/0488* (2013.01)

(58) Field of Classification Search
CPC ...... G06F 9/451; G06F 3/0481; G06F 3/0482; G06F 3/0488
See application file for complete search history.

(56) References Cited

U.S. PATENT DOCUMENTS

| 7,051,285 B1* | 5/2006 | Harrison | G06F 3/0481 715/760 |
| 8,266,544 B1* | 9/2012 | Kay | H04L 51/12 715/808 |
| 2002/0154163 A1* | 10/2002 | Melchner | G06Q 30/02 715/749 |
| 2004/0125149 A1* | 7/2004 | Lapidous | G06F 3/0481 715/808 |

(Continued)

*Primary Examiner* — Tuyetlien T Tran
(74) *Attorney, Agent, or Firm* — Foley & Lardner LLP (57) ABSTRACT

A method for controlling a pop-up window includes acquiring pop-up window configuration information that includes a pop-up window restriction condition. The method includes acquiring a pop-up window set that includes at least one pop-up window array, where each pop-up window array includes corresponding pop-up window information and a pop-up window page; acquiring a target page and traversing the pop-up window set. The target page is a page on which pop-up window control is performed, and the pop-up window page corresponding to the pop-up window array in the pop-up window set corresponds to the target page. The method includes controlling display of the pop-up window according to a relationship between the pop-up window information corresponding to the pop-up window array and the pop-up window restriction condition and matching between the pop-up window page corresponding to the pop-up window array and the target page.

17 Claims, 3 Drawing Sheets

(56) References Cited

U.S. PATENT DOCUMENTS

| | | | |
|---|---|---|---|
| 2006/0005148 A1* | 1/2006 | Cheng | G06F 9/451 |
| | | | 715/808 |
| 2007/0038956 A1* | 2/2007 | Morris | G06F 16/958 |
| | | | 715/808 |
| 2011/0131527 A1* | 6/2011 | Kim | G06F 3/0482 |
| | | | 715/808 |
| 2012/0066243 A1* | 3/2012 | Jammalamadaka | G06F 16/954 |
| | | | 707/759 |
| 2014/0192090 A1* | 7/2014 | Park | G06T 3/20 |
| | | | 345/672 |
| 2014/0244429 A1* | 8/2014 | Clayton | G06Q 30/0631 |
| | | | 705/26.7 |
| 2016/0065661 A1* | 3/2016 | Kang | H04N 1/00472 |
| | | | 709/203 |
| 2016/0086584 A1* | 3/2016 | Yokosuka | G06F 3/0481 |
| | | | 715/766 |
| 2016/0342285 A1* | 11/2016 | Wang | G06F 9/451 |
| 2017/0199853 A1* | 7/2017 | Kim | G06F 3/04842 |
| 2020/0042333 A1* | 2/2020 | Picard | G06F 9/451 |

* cited by examiner

METHOD AND DEVICE FOR CONTROLLING POP-UP WINDOW, ELECTRONIC DEVICE, AND STORAGE MEDIUM

CROSS-REFERENCE TO RELATED APPLICATIONS

This application is based upon and claims priority to Chinese Patent Application No. 202010331108.4, filed on Apr. 23, 2020, the disclosure of which is incorporated herein by reference in its entirety.

TECHNICAL FIELD

The disclosure relates to the field of Internet technologies, and in particular to a method and device for controlling a pop-up window, an electronic device, and a storage medium.

BACKGROUND

With the development of Internet technologies, a demand for Internet engineering projects is also increasing. In the Internet engineering projects, there is often a need for popping up of windows. Pop-up windows can generally function to prompt users to pay attention or to perform various operations. In traditional pop-up window control methods, a pop-up window is usually designed and developed at a corresponding position according to the proposed requirements, and a corresponding pop-up window will pop up when a trigger condition is met.

However, designing and developing pop-up windows in corresponding positions according to the proposed requirements often results in that the pop-up windows are distributed in various places throughout the project or even that multiple pop-up windows pop up on the same page and influence and cover each other when there is a demand for great number of pop-up windows.

SUMMARY

According to a first aspect of implementations of the disclosure, there is provided a method for controlling a pop-up window, including: acquiring pop-up window configuration information which includes a pop-up window restriction condition; acquiring a pop-up window set which includes at least one pop-up window array, where each of the at least one pop-up window array includes corresponding pop-up window information and a corresponding pop-up window page; acquiring a target page and traversing the pop-up window set, where the target page is a page on which pop-up window control is performed, and the pop-up window page corresponding to the pop-up window array in the pop-up window set corresponds to the target page; and controlling display of the pop-up window according to a relationship between the pop-up window information corresponding to the pop-up window array and the pop-up window restriction condition and matching between the pop-up window page corresponding to the pop-up window array and the target page.

In an example implementation, each pop-up window array includes corresponding pop-up window content. The controlling the display of the pop-up window according to the relationship between the pop-up window information corresponding to the pop-up window array and the pop-up window restriction condition and the matching between the pop-up window page corresponding to the pop-up window array and the target page includes: displaying the pop-up window on the target page based on the pop-up window content corresponding to the pop-up window array when the pop-up window information corresponding to the pop-up window array meets the pop-up window restriction condition and the pop-up window page corresponding to the pop-up window array matches the target page.

In an example implementation, the displaying the pop-up window on the target page according to the pop-up window content corresponding to the pop-up window array includes: generating a pop-up window message based on the pop-up window content corresponding to the pop-up window array; and displaying a corresponding pop-up window on the target page according to the pop-up message.

In an example implementation, the pop-up window restriction condition includes a caching duration of the pop-up window configuration information; after displaying the corresponding pop-up window on the target page according to the pop-up message, the method includes: generating a notification of a processed pop-up window in response to an instruction received on the pop-up window; returning to the operation of acquiring the target page and traversing the pop-up window set within the caching duration according to the notification; and returning to the operation of acquiring the pop-up window configuration information after the caching duration according to the notification.

In an example implementation, prior to controlling the display of the pop-up window according to the relationship between the pop-up window information corresponding to the pop-up window array and the pop-up window restriction condition and the matching between the pop-up window page corresponding to the pop-up window array and the target page, the method includes: detecting whether the pop-up window information corresponding to the pop-up window array meets the pop-up window restriction condition; and detecting the matching between the pop-up window page corresponding to the pop-up window array and the target page.

In an example implementation, the pop-up window restriction condition includes a maximum number of times of popping up for each pop-up window array within a preset time period, and the pop-up window information corresponding to the pop-up window array includes a number of times of popping up for the pop-up window array within the preset time period; the detecting whether the pop-up window information corresponding to the pop-up window array meets the pop-up window restriction condition includes: determining that the pop-up window information corresponding to the pop-up window array meets the pop-up window restriction condition when the number of times of popping up within the preset time period is less than the maximum number of times of popping up; and determining that the pop-up window information corresponding to the pop-up window array does not meet the pop-up window restriction condition when the number of times of popping up within the preset time period is greater than or equal to the maximum number of times of popping up.

In an example implementation, the detecting the matching between the pop-up window page corresponding to the pop-up window array and the target page includes: determining that the pop-up window page corresponding to the pop-up window array matches the target page when the pop-up window page corresponding to the pop-up window array is consistent with the target page; and determining that the pop-up window page corresponding to the pop-up window array does not match the target page when the pop-up window page corresponding to the pop-up window array is not consistent with the target page.

According to a second aspect of implementations of the disclosure, there is provided a device for controlling a pop-up window, including: a pop-up window configuration information acquiring unit configured to acquire pop-up window configuration information that includes a pop-up window restriction condition; a pop-up window set acquiring unit configured to acquire a pop-up window set that includes at least one pop-up window array, where each of the at least one pop-up window arrays includes corresponding pop-up window information and a pop-up window page; a pop-up window set traversing unit configured to acquire a target page and traverse the pop-up window set, wherein the target page is a page on which pop-up window control is performed, and the pop-up window page corresponding to the pop-up window array in the pop-up window set corresponds to the target page; and a pop-up window control unit configured to control display of the pop-up window according to a relationship between the pop-up window information corresponding to the pop-up window array and the pop-up window restriction condition and matching between the pop-up window page corresponding to the pop-up window array and the target page.

In an example implementation, each pop-up window array includes corresponding pop-up window content, and the pop-up window control unit is further configured to: display the pop-up window on the target page based on the pop-up window content corresponding to the pop-up window array when the pop-up window information corresponding to the pop-up window array meets the pop-up window restriction condition and the pop-up window page corresponding to the pop-up window array matches the target page.

In an example implementation, the pop-up window control unit is further configured to: generate a pop-up window message according to the pop-up window content corresponding to the pop-up window array; and display a corresponding pop-up window on the target page according to the pop-up window message.

In an example implementation, the pop-up window restriction condition includes a caching duration of the pop-up window configuration information, and the pop-up window control unit further includes a return control unit configured to: generate a notification of a processed pop-up window in response to an instruction received on the pop-up window; return to the operation of acquiring the target page and traversing the pop-up window set within the caching duration according to the notification; and return to the operation of acquiring the pop-up window configuration information after the caching duration according to the notification.

In an example implementation, the pop-up window control unit further includes a condition detecting unit configured to: detect whether the pop-up window information corresponding to the pop-up window array meets the pop-up window restriction condition; and detect the matching between the pop-up window page corresponding to the pop-up window array and the target page.

In an example implementation, the pop-up window restriction condition includes a maximum number of times of popping up for each pop-up window array within a preset time period, and the pop-up window information corresponding to the pop-up window array includes a number of times of popping up for the pop-up window array within the preset time period, and the condition detecting unit is further configured to: determine that the pop-up window information corresponding to the pop-up window array meets the pop-up window restriction condition when the number of times of popping up within the preset time period is less than the maximum number of times of popping up; determine that the pop-up window information corresponding to the pop-up window array does not meet the pop-up window restriction condition when the number of times of popping up within the preset time period is greater than or equal to the maximum number of times of popping up.

In an example implementation, the condition detecting unit is further configured to: determine that the pop-up window page corresponding to the pop-up window array matches the target page when the pop-up window page corresponding to the pop-up window array is consistent with the target page; and determine that the pop-up window page corresponding to the pop-up window array does not match the target page when the pop-up window page corresponding to the pop-up window array is inconsistent with the target page.

According to a third aspect of implementations of the disclosure, there is provided an electronic device including a processor, and a memory for storing instructions executable by the processor. The processor is configured to execute the instructions to implement the method for controlling the pop-up window described in any one of the implementations of the first aspect.

According to a fourth aspect of implementations of the disclosure, a storage medium is provided. Instructions in the storage medium, when being executed by a processor of an electronic device, cause the electronic device to perform the method for controlling the pop-up window described in any one of the implementations of the first aspect.

According to a fifth aspect of implementations of the disclosure, there is provided a computer program product including a computer program which is stored in a readable storage medium, and at least one processor of a device reads from the readable storage medium and executes the computer program to cause the device to perform the method for controlling the pop-up window described in any one of the implementations of the first aspect.

It should be understood that the above general description and the following detailed description are only example and explanatory, and do not limit the disclosure.

BRIEF DESCRIPTION OF THE DRAWINGS

The drawings herein are incorporated into and constitute a part of the specification, show implementations conforming to the disclosure, and together with the specification serve to explain the principles of the disclosure, and do not constitute an improper limitation of the disclosure.

DETAILED DESCRIPTION

In order to enable those of ordinary skill in the art to better understand the technical solutions of the disclosure, the technical solutions in the implementations of the disclosure will be described clearly and completely below with reference to the accompanying drawings.

It should be noted that the terms of "first", "second", etc. in the specification and claims of the disclosure and the above-mentioned drawings are used to distinguish similar objects, and not necessarily used to describe a specific sequence or order. It should be understood that the terms used in this way can be interchanged under appropriate circumstances so that the implementations of the disclosure described herein can be implemented in an order other than those illustrated or described herein. The implementations described in the following example implementations do not represent all implementations consistent with the disclosure. Rather, they are only examples of devices and methods consistent with some aspects of the disclosure as detailed in the appended claims.

Figure 1:
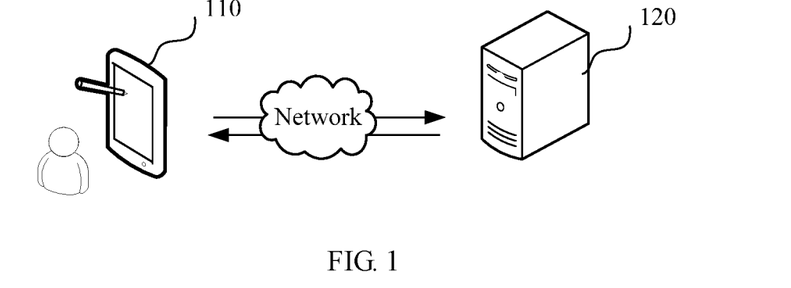
FIG. 1 is a diagram showing an application environment of a method for controlling a pop-up window according to an example implementation.

The method for controlling the pop-up window provided in the disclosure can be applied to an application environment shown in FIG. 1 in which a terminal 110 interacts with a server 120 through a network. The terminal 110 acquires pop-up window configuration information and a pop-up window set from the server 120, acquires a target page, traverses a relationship between the pop-up window set and the pop-up window configuration information and a relationship between the pop-up window set and the target page, and controls display of the pop-up window according to the relationship between the pop-up window set and the pop-up window configuration information and the relationship between the pop-up window set and the target page. The terminal 110 may be, but is not limited to, various personal computers, notebook computers, smart phones, tablet computers, and portable and wearable devices. The server 120 may be implemented as an independent server or a server cluster including multiple servers.

Figure 2:
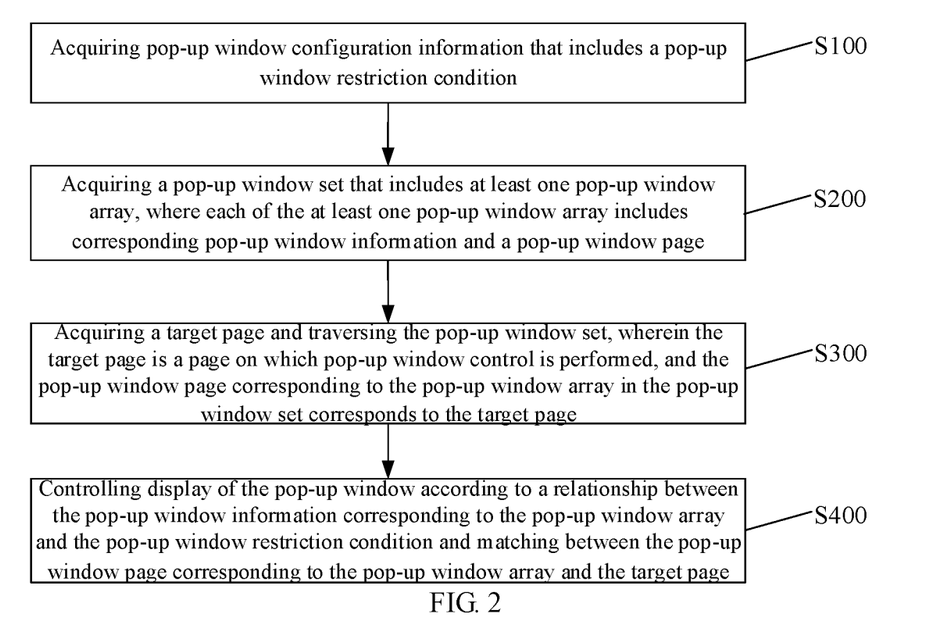
FIG. 2 is a flow chart showing a method for controlling a pop-up window according to an example implementation.

FIG. 2 is a flow chart showing a method for controlling a pop-up window according to an example implementation. As shown in FIG. 2, the method for controlling the pop-up window is applied to the terminal 110 in FIG. 1, and includes the following s.

In S100, pop-up window configuration information is acquired, where the pop-up window configuration information includes a pop-up window restriction condition.

In S200, a pop-up window set is acquired, where the pop-up window set includes at least one pop-up window array, and each pop-up window array includes corresponding pop-up window information and a pop-up window page.

In S300, a target page is acquired and the pop-up window set is traversed, where the target page is a page on which pop-up window control is performed, and the pop-up window page corresponding to the pop-up window array in the pop-up window set corresponds to the target page.

In S400, display of the pop-up window is controlled according to a relationship between the pop-up window information corresponding to the pop-up window array and the pop-up window restriction condition and matching between the pop-up window page corresponding to the pop-up window array and the target page.

The pop-up window refers to a window that pops up automatically when web pages, software, mobile phone applications, or the like are opened, and main popular applications thereof are to remind a user to pay attention or to remind the user to perform various operations, or to be used as a quick way to access certain web pages. The pop-up configuration information includes various information required for configuring a pop-up window, including a pop-up window restriction condition such as a maximum number of times of popping up within a preset time period, a caching duration of the pop-up window configuration information, and other extended information. The pop-up window information corresponding to the pop-up window array refers to a state of the pop-up window such as a number of times of popping up of the pop-up window corresponding to the pop-up window array in a preset time period. The pop-up window page corresponding to the pop-up window array refers to a page on which the pop-up window should be displayed (or pop up). For example, in clicking "Exit" to exit an application page, the corresponding page is the pop-up window page. The target page refers to a current page. For example, in exiting an application, the target page is an exit page of the application, and in making a payment, the target page is a payment page.

In some implementations, a pop-up window manager that supports a publish and subscribe mode is created in the terminal 110, the pop-up window configuration information and pop-up window set are obtained from the server 120, the current page is obtained as the target page, and the pop-up window set is traversed. The target page is a page on which pop-up control is performed. The pop-up window page corresponding to the pop-up window array in the pop-up window set corresponds to the target page, and can be used in detection of the matching between the pop-up window page and the target page so that the display of the pop-up window is controlled according to the relationship between the pop-up window information corresponding to the pop-up window array and the pop-up window restriction condition and the matching between the pop-up window page corresponding to the pop-up window array and the target page. When the pop-up window information corresponding to the pop-up window array meets the pop-up window restriction condition, and the pop-up window page corresponding to the pop-up window array matches the target page, the pop-up window is displayed (pops up) on the target page. For example, when the pop-up window corresponding to the pop-up window array satisfies the pop-up window restriction condition, the number of times of popping up is within the maximum number of times of popping up corresponding to the pop-up window restriction condition, and the pop-up window page corresponding to the pop-up window array is consistent with the target page, both of which are an exit page, a payment page, or other corresponding and consistent pages, the pop-up window corresponding to the pop-up window array is displayed. Otherwise, no pop-up window will be displayed. It should be noted that, in general, due to the limited attention of the user and the display range of the page, there are usually many cases where one pop-up window is displayed on a page, and thus the pop-up window restriction condition can include an additional restriction condition that only one pop-up window appears on each page. However, it is not intended to particularly limit the number of the pop-up windows on the pop-up window page which can be determined according to actual conditions in specific implementations.

In the above method for controlling the pop-up window, the pop-up window configuration information which includes a pop-up window restriction condition is acquired; a pop-up window set which includes at least one pop-up window array is acquired, each pop-up window array includes corresponding pop-up window information and a pop-up window page; a target page is acquired and the pop-up window set is traversed, where the target page is the page on which pop-up window control is performed and the pop-up window page corresponding to the pop-up window array in the pop-up window set corresponds to the target page; and display of the pop-up window is controlled according to the relationship between the pop-up window information corresponding to the pop-up window array and the pop-up window restriction condition and the matching between the pop-up window page corresponding to the pop-up window array and the target page, where the relationship between the pop-up window set and the pop-up window configuration information and the relationship between the pop-up window set and the target page are traversed, and the display of the pop-up window is controlled according to the relationship between the pop-up window set and the pop-up window configuration information and the relationship between the pop-up window set and the target page, the pop-up windows in the pop-up window set can be controlled uniformly, which avoids the situation where multiple pop-up windows pop up on the same page at the same time.

In an example implementation, as an implementation of operation S400, controlling the display of the pop-up window according to the relationship between the pop-up window information corresponding to the pop-up window array and the pop-up window restriction condition and the matching between the pop-up window page corresponding to the pop-up window array and the target page includes:

displaying the pop-up window on the target page based on the pop-up window content corresponding to the pop-up window array when the pop-up window information corresponding to the pop-up window array meets the pop-up window restriction condition and the pop-up window page corresponding to the pop-up window array matches the target page.

Each pop-up window array includes corresponding pop-up window content, the pop-up window content corresponding to the pop-up window array refers to content and information displayed on an interface of the pop-up window. For example, in exiting an application program, a pop-up window is usually displayed with the pop-up window content of "whether to exit this application".

In some implementations, if the pop-up window information corresponding to the pop-up window array does not meet the pop-up window restriction condition, or the pop-up window page corresponding to the pop-up window array does not match the target page, it is determined that the pop-up window should not be sent as a reminder in such a state, and the pop-up window is not displayed. If the pop-up window information corresponding to the pop-up window array meets the pop-up window restriction condition, and the pop-up window page corresponding to the pop-up window array matches the target page, it is determined that the pop-up window should be sent as a reminder in such a state, and the pop-up window is displayed on the target page based on the pop-up window content corresponding to the pop-up window array.

Figure 3:
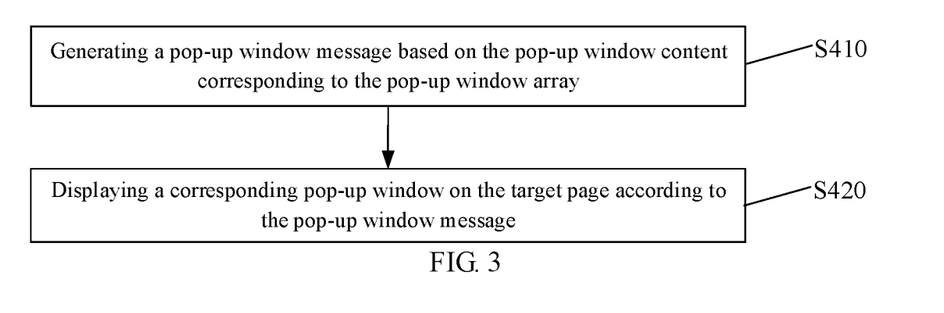
FIG. 3 is a flow chart showing an implementation of operation S400 according to an example implementation.

In some implementations, FIG. 3 is a flowchart of an implementation of operation S400 according to an example implementation, and displaying the pop-up window on the target page based on the pop-up window content corresponding to the pop-up window array includes the followings.

In S410, a pop-up window message is generated based on the pop-up window content corresponding to the pop-up window array.

In S420, a corresponding pop-up window is displayed on the target page according to the pop-up window message.

In some implementations, as mentioned earlier, a pop-up window manager that supports the publish and subscribe mode is created in the terminal 110, the pop-up window configuration information and pop-up window set are acquired from the server 120, the current page is acquired as the target page, and the pop-up window set is traversed, where the target page is the page on which pop-up window control is performed, and the pop-up window page corresponding to the pop-up window array in the pop-up set corresponds to the target page, which can be used in detection of the matching between the pop-up window page and the target page, so that the display of the pop-up window is controlled according to the relationship between the pop-up window information corresponding to the pop-up window array and the pop-up window restriction condition and the matching between the pop-up window page corresponding to the pop-up window array and the target page. In such case, when the pop-up window information corresponding to the pop-up window array meets the pop-up window restriction condition, and the pop-up window page corresponding to the pop-up window array matches the target page, the pop-up window message is generated according to the pop-up window content corresponding to the pop-up window array, and this pop-up window message is stored in the pop-up window manager that supports the publish and subscribe mode. In some implementations, a unified pop-up window component is added at the project entrance, the pop-up window component subscribes to the pop-up window messages of the pop-up window manager, and displays the corresponding pop-up window on the target page when monitoring a new pop-up window message.

In the above example implementation, when the pop-up window information corresponding to the pop-up window array meets the pop-up window restriction condition, and the pop-up window page corresponding to the pop-up window array matches the target page, the pop-up window message is generated based on the pop-up window content corresponding to the pop-up window array, and the corresponding pop-up window is displayed on the target page. The pop-up window manager manages the pop-up window messages uniformly, and the terminal application side only needs to monitor the pop-up message of the pop-up window manager and to invoke the pop-up window component that conforms to the application style. The pop-up windows is managed uniformly to ensure that there will only be one or a specified number of pop-up windows at a time, which simplifies the logic on the terminal application side, and the specific content of the pop-up windows can be configured and distributed by the server.

Figure 4:
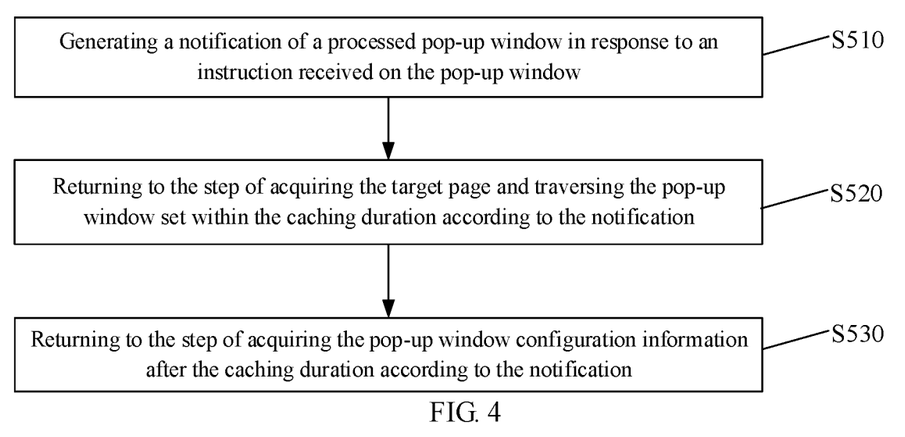
FIG. 4 is a flow chart showing an implementation after operation S400 according to an example implementation.

FIG. 4 is a flowchart of an implementation subsequent to S400 according to an example implementation, and displaying the corresponding pop-up window on the target page according to the pop-up window message includes the following.

In S510, in response to an instruction received on the pop-up window, a notification of a processed pop-up window is generated.

In S520, it returns to the operation of acquiring the target page and traversing the pop-up window set within the caching duration according to the notification.

In operation S530, it returns to the operation of acquiring the pop-up window configuration information after the caching duration according to the notification.

The pop-up window restriction conditions includes the caching duration of the pop-up window configuration information, during which the pop-up window configuration information and the pop-up window set obtained previously from the server side are saved.

In some implementations, after the pop-up window is displayed, an operation by the user is monitored, an instruction is generated when the user performs operation on the pop-up window, and a notification of a processed pop-up window is generated according to the instruction. The notification of the processed pop-up window indicates that the displayed pop-up window has been processed by the user. Accordingly, when it is currently within the preset caching duration, it returns to the operation of acquiring the target page and traversing the pop-up window set according to the notification so as to perform the pop-up window control. If it currently exceeds the preset caching duration, it returns to the operation of acquiring the pop-up window configuration information according to the notification so as to perform the pop-up window control.

In the above example implementation, in response to the instruction received on the pop-up window, the notification of the pop-up window being processed is generated; it returns to the operation of acquiring the target page and traversing the pop-up window set within the caching duration according to the notification, and returns to the operation of acquiring the pop-up window configuration information after the caching duration according to the notification. By setting the caching duration, it is possible to avoid frequently pulling information from the server during the caching duration, and the pop-up window is controlled by acquiring the pop-up window configuration information and pop-up window set from the cache within the caching duration.

In an example implementation, as an implementation prior to operation S400, controlling the display of the pop-up window according to the relationship between the pop-up window information corresponding to the pop-up window array and the pop-up window restriction condition and the matching between the pop-up window page corresponding to the pop-up window array and the target page includes: detecting whether the pop-up window information corresponding to the pop-up window array meets the pop-up window restriction condition; and detecting the matching between the pop-up window page corresponding to the pop-up window array and the target page.

In some implementations, detecting whether the pop-up window information corresponding to the pop-up window array meets the pop-up window restriction condition and detecting the matching between the pop-up window page corresponding to the pop-up window array and the target page provides a data basis for controlling the display of the pop-up window according to the relationship between the pop-up window information corresponding to the pop-up window array and the pop-up window restriction condition and the matching between the pop-up window page corresponding to the pop-up window array and the target page.

In some implementations, the pop-up window restriction condition includes a maximum number of times of popping up for each pop-up window array in a preset time period, the pop-up window information corresponding to the pop-up window array includes a number of times of popping up for the pop-up window array in the preset time period. When the number of times of popping up within the preset time period is less than the maximum number of times of popping up, the pop-up window information corresponding to the pop-up window array meets the pop-up window restriction condition, and when the number of times of popping up within the preset time period is greater than or equal to the maximum number of times of popping up, the pop-up window information corresponding to the pop-up window array does not meet the pop-up window restriction condition.

In some implementations, in applications of engineering pop-up windows, the pop-up window is usually used to remind users to pay attention or to remind users to perform various operations. If the pop-up window pops up multiple times within a preset time period (for example, an hour or a day), it will make the user feel bored, seriously affect the user experience of the application, and even lead to the loss of users. In order to control the number of times of popping up of the pop-up window within the preset time period, the pop-up window restriction condition is set, which limits a maximum number of times of popping up within the preset time period. As such, if the number of times of popping up within the preset time period is less than the maximum number of times of popping up, the pop-up window information corresponding to the pop-up window array is determined to meet the pop-up window restriction condition, and if the number of times of popping up within the preset time period is greater than or equal to the maximum number of times of popping up, it is determined that the pop-up window information corresponding to the pop-up window array does not meet the pop-up window restriction condition.

In some implementations, if the pop-up window page corresponding to the pop-up window array is consistent with the target page, the pop-up window page corresponding to the pop-up window array matches the target page, and if the pop-up window page corresponding to the pop-up window array is inconsistent with the target page, the pop-up window page corresponding to the pop-up window array does not match the target page.

In some implementations, in applications of the engineering pop-up window, the pop-up window is generally used in specific pages so as to remind the user to pay attention or to remind the user to perform various operations, for example, to remind the user whether to exit on an exit page, or to remind the user to pay attention to security or enter a password on a payment page. Therefore, different pop-up window reminders are required on different pages. When the pop-up window page corresponding to the pop-up window array is consistent with the target page, it is determined that the pop-up window page corresponding to the pop-up window array matches the target page, and a pop-up frame can be displayed. When the pop-up window page corresponding to the pop-up window array is inconsistent with the target page, it is determined that the pop-up window page corresponding to the pop-up window array does not match the target page.

In the above example implementations, it is detected whether the pop-up window information corresponding to the pop-up window array meets the pop-up window restriction condition, and the matching between the pop-up window page corresponding to the pop-up window array and the target page is detected. If the number of times of popping up within the preset time period is less than the maximum number of times of popping up, the pop-up window information corresponding to the pop-up window array meets the pop-up window restriction condition, and if the number of times of popping up within the preset time period is greater than or equal to the maximum number of times of popping up, the pop-up window information corresponding to the pop-up window array does not meet the pop-up window restriction condition. If the pop-up window page corresponding to the pop-up window array is consistent with the target page, the pop-up window page corresponding to the pop-up window array matches the target page, and if the pop-up window page corresponding to the pop-up window array is inconsistent with the target page, the pop-up window page corresponding to the pop-up window array does not match the target page. It provides a data basis for controlling the display of the pop-up window according to the relationship between the pop-up window information corresponding to the pop-up window array and the pop-up window restriction condition, and the matching between the pop-up window page corresponding to the pop-up window array and the target page. At the same time, by setting the maximum number of times of popping up within the preset time period, it can prevent a pop-up window from popping up multiple times within the preset time period and thus improve the user experience.

It should be understood that although the operations in the flowcharts of FIGS. 1-4 are sequentially shown in the guidance of arrows, these operations are not necessarily performed sequentially in the order indicated by the arrows. Unless explicitly specified herein, the order of these operations is not strictly limited, and these operations can be performed in other orders. Moreover, at least a part of the operations shown in FIGS. 1-4 may include multiple operations or multiple stages which are not necessarily performed simultaneously, and may be performed at different times. These operations or stages are not necessarily performed sequentially, and may be performed in turn or alternately with other operations or at least a part of operations or stages of the other operations.

Figure 5:
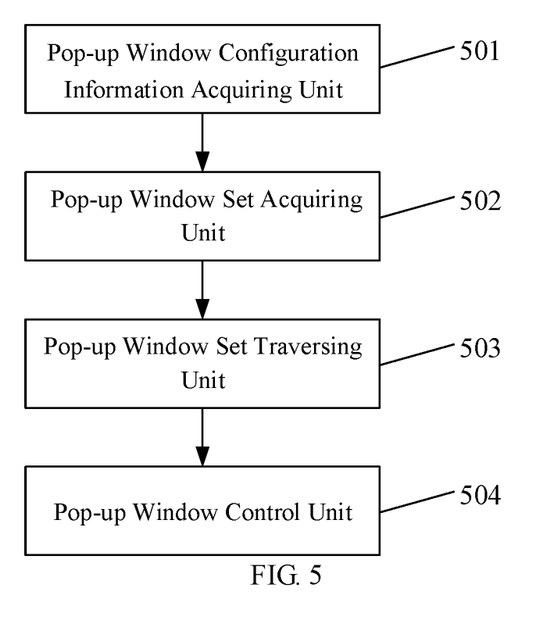
FIG. 5 is a block diagram showing a device for controlling a pop-up window according to an example implementation.

FIG. 5 is a block diagram showing a device for controlling a pop-up window according to an example implementation. With reference to FIG. 5, the device includes a pop-up window configuration information acquiring unit 501, a pop-up window set acquiring unit 502, a pop-up window set traversing unit 503, and a pop-up window control unit 504.

The pop-up window configuration information acquiring unit 501 is configured to acquire pop-up window configuration information that includes a pop-up window restriction condition.

The pop-up window set acquiring unit 502 is configured to acquire a pop-up window set that includes at least one pop-up window array, where each of the at least one pop-up window arrays includes corresponding pop-up window information and a pop-up window page.

The pop-up window set traversing unit 503 is configured to acquire a target page and traverse the pop-up window set. The target page is a page on which pop-up window control is performed, and the pop-up window page corresponding to the pop-up window array in the pop-up window set corresponds to the target page.

The pop-up window control unit 504 is configured to control display of the pop-up window according to a relationship between the pop-up window information corresponding to the pop-up window array and the pop-up window restriction condition and matching between the pop-up window page corresponding to the pop-up window array and the target page.

In an example implementation, the pop-up window control unit 504 is further configured to display the pop-up window on the target page based on pop-up window content corresponding to the pop-up window array when the pop-up window information corresponding to the pop-up window array meets the pop-up window restriction condition and the pop-up window page corresponding to the pop-up window array matches the target page.

In an example implementation, the pop-up window control unit 504 is further configured to generate a pop-up window message based on the pop-up window content corresponding to the pop-up window array and display the corresponding pop-up window on the target page based on the pop-up window message.

In an example implementation, the pop-up window restriction condition includes a caching duration of the pop-up window configuration information, and the device for controlling the pop-up window further includes a return control unit configured to generate a notification of a processed pop-up window in response to an instruction received on the pop-up window, return to the operation of acquiring the target page and traversing the pop-up window set within the caching duration according to the notification, and return to the operation of acquiring the pop-up configuration information after the caching duration according to the notification.

In an example implementation, the device for controlling the pop-up window further includes a condition detecting unit configured to detect whether the pop-up window information corresponding to the pop-up window array meets the pop-up window restriction condition and detect matching between the pop-up window page corresponding to the pop-up window array and the target page.

In an example implementation, the pop-up window restriction condition includes a maximum number of times of popping up for each pop-up window array in a preset time period, the pop-up window information corresponding to the pop-up window array includes a number of times of popping up for the pop-up window array in the preset time period. The condition detecting unit is further configured to determine that the pop-up window information corresponding to the pop-up window array meets the pop-up window restriction condition when the number of times of popping up within the preset time period is less than the maximum number of times of popping up, and determine that the pop-up window information corresponding to the window array does not meet the pop-up window restriction condition when the number of times of popping up within the preset time period is greater than or equal to the maximum number of times of popping up.

In an example implementation, the condition detecting unit is further configured to determine that the pop-up window page corresponding to the pop-up array matches the target page when the pop-up window page corresponding to the pop-up window array is consistent with the target page, and determine that the pop-up window page corresponding to the pop-up array does not match the target page when the pop-up window page corresponding to the pop-up window array is inconsistent with the target page.

With respect to the device in the above implementations, the specific manner in which each of the modules performs operation has been described in detail in the implementations of the related method, which will not be repeated here.

Figure 6:
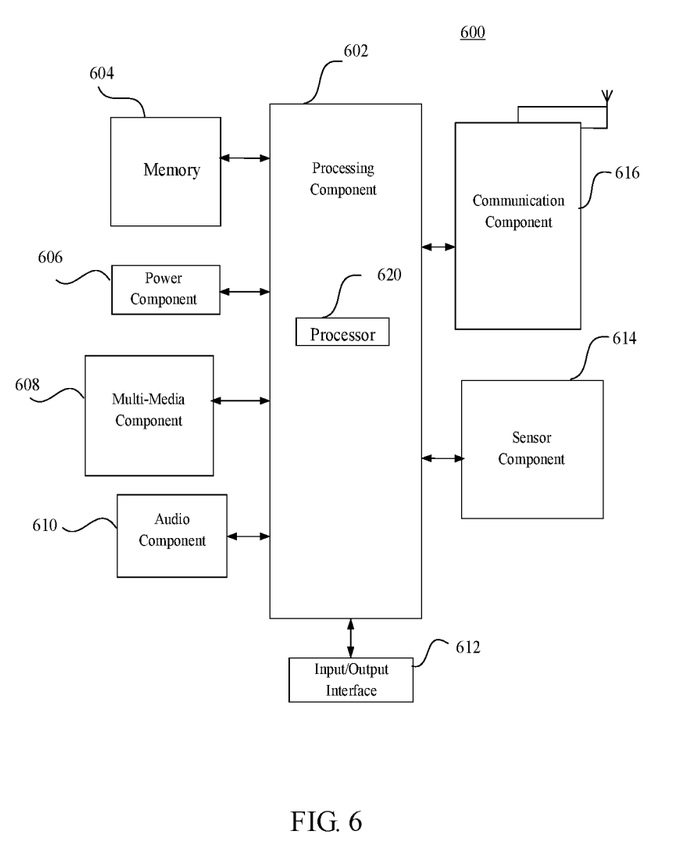
FIG. 6 is a structural block diagram of an electronic device according to an example implementation.

FIG. 6 is a block diagram showing an electronic device 600 for controlling a pop-up window according to an example implementation. For example, the device 600 may be a mobile phone, a computer, a digital broadcasting terminal, a messaging device, a game console, a tablet device, a medical device, a fitness device, a personal digital assistant, etc.

Referring to FIG. 6, the device 600 may include one or more of the following components: a processing component 602, a memory 604, a power component 606, a multi-media component 608, an Audio Component 610, an input/output (I/O) interface 612, a sensor component 614, and a communication component 616.

The processing component 602 generally controls overall operations of the device 600, such as operations associated with display, telephone calls, data communications, camera operations, and recording operations. The processing component 602 may include one or more processors 620 to execute instructions so as to implement all or part of the operations of the foregoing methods. In addition, the processing component 602 may include one or more modules to facilitate interaction between the processing component 602 and other components. For example, the processing component 602 may include a multi-media module to facilitate the interaction between the multi-media component 608 and the processing component 602.

The memory 604 is configured to store various types of data to support operations on the device 600. Examples of the data include instructions for any application or method operating on the device 600, contact data, phone book data, messages, pictures, videos, etc. The memory 604 can be implemented in any type of volatile or non-volatile storage device, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk and an optical disk, or a combinations thereof.

The power supply component 606 provides power to various components of the device 600. The power supply component 606 may include a power management system, one or more power supplies, and other components associated with generating, managing, and distributing power for the device 600.

The multi-media component 608 includes a screen that provides an output interface between the device 600 and the user. In some implementations, the screen may include a Liquid Crystal Display (LCD) or a Touch Panel (TP). When the screen includes the touch panel, the screen can be implemented as a touch screen for receiving input signals from the user. The touch panel includes one or more touch sensors to sense gestures such as touching and sliding on the touch panel. The touch sensors can not only sense a boundary of the touching or sliding operation, but also detect a duration and pressure associated with the touching or sliding operation. In some implementations, the multi-media component 608 includes a front camera and/or a rear camera. When the device 600 is in an operation mode, such as a shooting mode or a video mode, the front camera and/or the rear camera can receive external multi-media data. Each of the front camera and the rear camera can be a fixed optical lens system or have focusing and optical zooming capabilities.

The audio component 610 is configured to output and/or input audio signals. For example, the audio component 610 includes a microphone (MIC). When the device 600 is in an operation mode, such as a call mode, a recording mode or a voice recognition mode, the microphone is configured to receive external audio signals. The received audio signals may be further stored in the memory 604 or sent via the communication component 616. In some implementations, the audio component 610 further includes a speaker for outputting the audio signals.

The I/O interface 612 provides an interface between the processing component 602 and a peripheral interface module. The peripheral interface module may be a keyboard, a click wheel, a button, or the like. The button may include but is not limited to a home button, a volume button, a start button, and a lock button.

The sensor component 614 includes one or more sensors for providing various state evaluations of the device 600. For example, the sensor component 614 can detect an on/off state of the device 600 and relative positioning of a component such as a display or a keypad of the device 600. The sensor component 614 can also detect a position change of the device 600 or a component of the device 600, presence or absence of contact with the device 600 by the user, orientation or acceleration/deceleration of the device 600, and temperature changes of the device 600. The sensor component 614 may include a proximity sensor configured to detect presence of a nearby object without any physical contact. The sensor component 614 may also include an optical sensor, such as a CMOS or CCD image sensor, for use in imaging applications. In some implementations, the sensor component 614 may also include an acceleration sensor, a gyroscope sensor, a magnetic sensor, a pressure sensor or a temperature sensor.

The communication component 616 is configured to facilitate wired or wireless communication between the device 600 and other devices. The device 600 can access a wireless network based on a communication standard, such as Wi-Fi, an operator network (e.g., 2G, 3G, 4G, or 5G), or a combination thereof. In an example implementation, the communication component 616 receives a broadcast signal or broadcast related information from an external broadcast management system via a broadcast channel. In an example implementation, the communication component 616 further includes a Near Field Communication (NFC) module to facilitate short-range communication. For example, the NFC module can be implemented based on a Radio Frequency Identification (RFID) technology, an Infrared Data Association (IrDA) technology, an ultra-wideband (UWB) technology, a Bluetooth (BT) technology or other technologies.

In an example implementation, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above methods.

In an example implementation, an electronic device is also provided. The electronic device includes a processor and a memory for storing instructions executable by the processor. The processor is configured to execute the instructions to implement the method for controlling the pop-up window according to any one of the foregoing implementations.

In an example implementation, a storage medium is also provided. Instructions in the storage medium, when being executed by a processor of an electronic device, cause the electronic device to perform the method for controlling the pop-up window according to any one of the above implementations.

In an example implementation, there is also provided a non-transitory computer-readable storage medium including instructions, such as the memory 604 including instructions. The instructions can be executed by the processor 620 of the device 600 to carry out the foregoing methods. For example, the non-transitory computer-readable storage medium may be a ROM, a Random Access Memory (RAM), a CD-ROM, a magnetic tape, a floppy disk, an optical data storage device, etc.

After considering the description and practicing the disclosure disclosed herein, those skilled in the art will easily think of other implementations of the disclosure. This disclosure is intended to cover any variations, uses, or adaptive changes of the disclosure that follow the general principles of the disclosure and include common general knowledge or common technical means in the technical field which are not disclosed in the disclosure. The description and implementations shall be considered example only, and the true scope and spirit of this disclosure are defined by the claims.

It should be understood that the disclosure is not limited to the precise structures that have been described above and shown in the drawings, and various modifications and changes can be made without departing from the scope thereof. The scope of the disclosure is defined only by the appended claims.

What is claimed is:

1. A method for controlling a pop-up window, comprising:
acquiring pop-up window configuration information that comprises a pop-up window restriction condition, the pop-up window restriction condition comprising a maximum number of times of popping up for each pop-up window array within a preset time period;
acquiring a pop-up window set that comprises at least one pop-up window array, where each of the at least one pop-up window array comprises corresponding pop-up window information and a pop-up window page, and the pop-up window information comprises a number of times of popping up for the pop-up window array in the preset time period;
acquiring a target page and traversing the pop-up window set, wherein the target page is a page on which pop-up window control is performed, and the pop-up window page corresponding to the pop-up window array in the pop-up window set corresponds to the target page; and
determining, in response to the number of times of popping up for the pop-up window array within the preset time period is greater than or equal to the maximum number of times of popping up, that the pop-up window information corresponding to the pop-up window array does not meet the pop-up window restriction condition, and controlling the pop-up window not to be displayed.

2. The method according to claim 1, wherein each pop-up window array comprises corresponding pop-up window content, and the method further comprises:
displaying the pop-up window on the target page based on the pop-up window content corresponding to the pop-up window array, in response to determining that the pop-up window information corresponding to the pop-up window array meets the pop-up window restriction condition and the pop-up window page corresponding to the pop-up window array matches the target page.

3. The method according to claim 2, wherein the displaying the pop-up window on the target page based on the pop-up window content corresponding to the pop-up window array comprises:
generating a pop-up window message based on the pop-up window content corresponding to the pop-up window array; and
displaying a corresponding pop-up window on the target page according to the pop-up window message.

4. The method according to claim 3, wherein the pop-up window restriction condition comprises a caching duration of the pop-up window configuration information, and
wherein after displaying the corresponding pop-up window on the target page according to the pop-up window message, the method comprises:
generating a notification of a processed pop-up window in response to an instruction received on the pop-up window;
returning to acquiring the target page and traversing the pop-up window set within the caching duration according to the notification; and
returning to acquiring the pop-up window configuration information after the caching duration according to the notification.

5. The method according to claim 1, wherein prior to determining the pop-up window information corresponding to the pop-up window array does not meet the pop-up window restriction condition, and controlling the pop-up window not to be displayed, the method comprises:
detecting the matching between the pop-up window page corresponding to the pop-up window array and the target page.

6. The method according to claim 5, wherein the detecting the matching between the pop-up window page corresponding to the pop-up window array and the target page comprises:
determining that the pop-up window page corresponding to the pop-up window array matches the target page in response to determining that the pop-up window page corresponding to the pop-up window array is consistent with the target page; and
determining that the pop-up window page corresponding to the pop-up window array does not match the target page in response to determining that the pop-up window page corresponding to the pop-up window array is inconsistent with the target page.

7. The method according to claim 1, wherein the pop-up window restriction condition further comprises the maximum number of times of popping up for each pop-up window array on each pop-up window page within a preset time period.

8. The method according to claim 7, wherein the maximum number of times of popping up for each pop-up window array is 1.

9. An electronic device, comprising:
a processor; and
a memory for storing instructions executable by the processor,
wherein the processor is configured to execute the instructions to perform a method for controlling a pop-up window, the method comprising:
acquiring pop-up window configuration information that comprises a pop-up window restriction condition, the pop-up window restriction condition comprising a maximum number of times of popping up for each pop-up window array within a preset time period;
acquiring a pop-up window set that comprises at least one pop-up window array, where each of the at least one pop-up window array comprises corresponding pop-up window information and a pop-up window page, and the pop-up window information comprises a number of times of popping up for the pop-up window array in the preset time period;
acquiring a target page and traversing the pop-up window set, wherein the target page is a page on which pop-up window control is performed, and the pop-up window page corresponding to the pop-up window array in the pop-up window set corresponds to the target page; and
determining, in response to the number of times of popping up for the pop-up window array within the preset time period is greater than or equal to the maximum number of times of popping up, that the pop-up window information corresponding to the pop-up window array does not meet the pop-up window restriction condition, and controlling the pop-up window not to be displayed.

10. The electronic device according to claim 9, wherein each pop-up window array comprises corresponding pop-up window content, and the method further comprises:

displaying the pop-up window on the target page based on the pop-up window content corresponding to the pop-up window array, in response to determining that the pop-up window information corresponding to the pop-up window array meets the pop-up window restriction condition and the pop-up window page corresponding to the pop-up window array matches the target page.

11. The electronic device according to claim 10, wherein the displaying the pop-up window on the target page based on the pop-up window content corresponding to the pop-up window array comprises:

generating a pop-up window message based on the pop-up window content corresponding to the pop-up window array; and displaying a corresponding pop-up window on the target page according to the pop-up window message.

12. The electronic device according to claim 11, wherein the pop-up window restriction condition comprises a caching duration of the pop-up window configuration information, and wherein after displaying the corresponding pop-up window on the target page according to the pop-up window message, the method comprises:

generating a notification of a processed pop-up window in response to an instruction received on the pop-up window;

returning to acquiring the target page and traversing the pop-up window set within the caching duration according to the notification; and returning to acquiring the pop-up window configuration information after the caching duration according to the notification.

13. The electronic device according to claim 9, wherein prior to determining the pop-up window information corresponding to the pop-up window array does not meet the pop-up window restriction condition, and controlling the pop-up window not to be displayed, the method comprises:

detecting the matching between the pop-up window page corresponding to the pop-up window array and the target page.

14. The electronic device according to claim 13, wherein said detecting the matching between the pop-up window page corresponding to the pop-up window array and the target page comprises:

determining that the pop-up window page corresponding to the pop-up window array matches the target page in response to determining that the pop-up window page corresponding to the pop-up window array is consistent with the target page; and determining that the pop-up window page corresponding to the pop-up window array does not match the target page in response to determining that the pop-up window page corresponding to the pop-up window array is inconsistent with the target page.

15. The electronic device according to claim 9, wherein the pop-up window restriction condition further comprises the maximum number of times of popping up for each pop-up window array on each pop-up window page within a preset time period.

16. The electronic device according to claim 15, wherein the maximum number of times of popping up for each pop-up window array is 1.

17. A non-transitory computer-readable storage medium having stored there on instructions which, when being executed by a processor of an electronic device, cause the electronic device to perform a method for controlling the pop-up window, the method comprising:

acquiring pop-up window configuration information that comprises a pop-up window restriction condition, the pop-up window restriction condition comprising a maximum number of times of popping up for each pop-up window array within a preset time period;

acquiring a pop-up window set that comprises at least one pop-up window array, where each of the at least one pop-up window array comprises corresponding pop-up window information and a pop-up window page, and the pop-up window information comprises a number of times of popping up for the pop-up window array in the preset time period;

acquiring a target page and traversing the pop-up window set, wherein the target page is a page on which pop-up window control is performed, and the pop-up window page corresponding to the pop-up window array in the pop-up window set corresponds to the target page; and determining, in response to the number of times of popping up for the pop-up window array within the preset time period is greater than or equal to the maximum number of times of popping up, that the pop-up window information corresponding to the pop-up window array does not meet the pop-up window restriction condition, and controlling the pop-up window not to be displayed.

* * * * *